(12) United States Patent
Sun et al.

(10) Patent No.: US 11,353,737 B2
(45) Date of Patent: Jun. 7, 2022

(54) POLARIZER, DISPLAY PANEL AND DISPLAY DEVICE

(71) Applicants: Beijing BOE Display Technology Co., Ltd., Beijing (CN); BOE Technology Group Co., Ltd., Beijing (CN)

(72) Inventors: Zhihua Sun, Beijing (CN); Yanping Liao, Beijing (CN); Ting Dong, Beijing (CN); Yingying Qu, Beijing (CN); Yifu Chen, Beijing (CN); Jianhua Huang, Beijing (CN); Zhiyu Lv, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/840,980

(22) Filed: Apr. 6, 2020

(65) Prior Publication Data
US 2021/0109401 A1 Apr. 15, 2021

(30) Foreign Application Priority Data
Oct. 9, 2019 (CN) .......................... 201910952790.6

(51) Int. Cl.
*G02F 1/1335* (2006.01)
*G02B 5/30* (2006.01)

(52) U.S. Cl.
CPC ......... *G02F 1/133528* (2013.01); *G02B 5/30* (2013.01); *G02F 1/133514* (2013.01)

(58) Field of Classification Search
CPC ......... G02F 1/133528; G02F 1/133514; G02B 5/30
USPC ....................................................... 359/437
See application file for complete search history.

(56) References Cited

U.S. PATENT DOCUMENTS

| 2001/0048497 | A1  | 12/2001 | Miyachi et al. |
| 2008/0204633 | A1  | 8/2008  | Jeon et al. |
| 2016/0070129 | A1  | 3/2016  | Kang |
| 2018/0157068 | A1  | 6/2018  | Yanai et al. |
| 2018/0259812 | A1* | 9/2018  | Goda ........................ G02B 5/30 |
| 2021/0191195 | A1* | 6/2021  | Yamada ............ G02F 1/133514 |

FOREIGN PATENT DOCUMENTS

| CN | 1932606    | A | 3/2007 |
| CN | 101052913  | A | 10/2007 |
| CN | 103278962  | A | 9/2013 |
| CN | 107346042  | A | 11/2017 |
| CN | 107850721  | A | 3/2018 |

OTHER PUBLICATIONS

Office Action dated Sep. 10, 2021 for corresponding Chinese application 201910952790.6.

* cited by examiner

*Primary Examiner* — Nathanael R Briggs
*Assistant Examiner* — William D Peterson
(74) *Attorney, Agent, or Firm* — ArentFox Schiff LLP; Michael Fainberg

(57) ABSTRACT

The present disclosure relates to the technical field of display and discloses a polarizer, a display panel and a display device, where the polarizer includes two layers of protective films, as well as one layer of main polarizing film and at least one layer of auxiliary polarizing film between the two layers of protective films, and a set angular difference exists between an angle of a transmittance axis of the auxiliary polarizing film and an angle of a transmittance axis of the main polarizing film.

16 Claims, 2 Drawing Sheets

US 11,353,737 B2

POLARIZER, DISPLAY PANEL AND DISPLAY DEVICE

CROSS-REFERENCE TO RELATED APPLICATION

This application claims priority of Chinese Patent Application No. 201910952790.6, filed on Oct. 9, 2019, which is hereby incorporated by reference in its entirety.

FIELD

The present disclosure relates to the technical field of display, in particular to a polarizer, a display panel and a display device.

BACKGROUND

An LCD in a display mode with an advanced super dimension switch (ADS) technology has advantages of high resolution, high transmittance, low power consumption, wide angle of view, high aperture rate, low color difference, no push Mura, etc.

SUMMARY

The present disclosure provides the following technical solution.

A polarizer includes two protective films, one main polarizing film and at least one auxiliary polarizing film between the two protective films, where a set angular difference exists between an angle of a transmittance axis of the auxiliary polarizing film and an angle of a transmittance axis of the main polarizing film.

Optionally, the set angular difference is −3°~3°.

Optionally, the polarizer includes a plurality of auxiliary polarizing films including at least one negative polarizing film and at least one positive polarizing film, where an angle of a transmittance axis of the negative polarizing film is less than the angle of the transmittance axis of the main polarizing film, and an angle of a transmittance axis of the positive polarizing film is greater than the angle of the transmittance axis of the main polarizing film.

Optionally, the negative polarizing film and the positive polarizing film are set in pairs, and a pair of negative polarizing film and positive polarizing film constitute a polarizing film group.

Optionally, the angle of the transmittance axis of the main polarizing film is 90°, and a sum of the angles of the transmittance axis of the negative polarizing film and the transmittance axis of the positive polarizing film in each polarizing film group is 180°.

Optionally, the plurality of auxiliary polarizing films include two polarizing film groups.

Optionally, an angle of a transmittance axis of a negative polarizing film is 88.7°~89.3°, and an angle of a transmittance axis of a positive polarizing film is 90.7°~91.3° in a first polarizing film group of the two polarizing film groups; and an angle of a transmittance axis of a negative polarizing film is 87.7°~88.3° and an angle of a transmittance axis of a positive polarizing film is 91.7°~92.3° in the second polarizing film group of the two polarizing film groups.

Optionally, the angles of the transmittance axis of the negative polarizing film and the transmittance axis of the positive polarizing film in the first polarizing film group are 89° and 91° respectively, and the angles of the transmittance axis of the negative polarizing film and the transmittance axis of the positive polarizing film in the second polarizing film group are 88° and 92° respectively.

A display panel includes the polarizer according to any one of the above descriptions.

Optionally, the display panel also includes an LCD module, and the polarizer is arranged on a color film substrate of the LCD module.

A display device includes the display panel according to any one of the above descriptions.

DETAILED DESCRIPTION OF THE EMBODIMENTS

Technical solutions in embodiments of the present disclosure will be described clearly and completely below in combination with accompanying drawings in the embodiments of the present disclosure. Obviously, the described embodiments are only a part of the embodiments of the present disclosure, rather than all of the embodiments. Based on the embodiments of the present disclosure, all other embodiments obtained by common technicians in the field without any creative work belong to the scope of protection of the present disclosure.

The high brightness of the LCD in a display mode with ADS under the dark state is caused by the following two reasons: firstly, a rubbing process causes a pre-tilt angle, which can be improved by a low pre-tilt angle liquid crystal alignment film (Low TBA PI) or an optical alignment process (OA process), and secondly, there is deviation between a rubbing angle and an angle of a transmittance axis of a polarizer (POL) to cause light leakage, which cannot be solved easily because the rubbing process and a POL attachment process are now in optimal states, and the rubbing angle cannot be monitored in real time in the attachment process.

Figure 1:
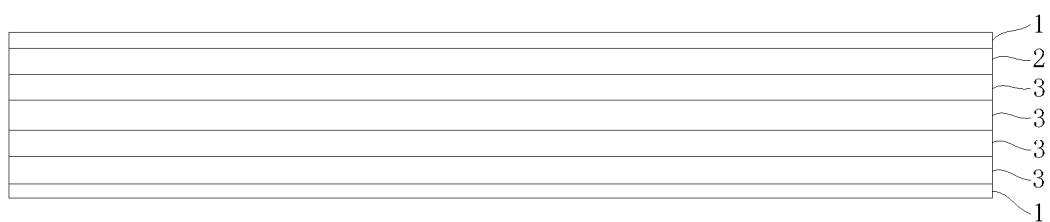
FIG. 1 is a schematic diagram of a section structure of a polarizer provided by an embodiment of the present disclosure.
Figure 2:
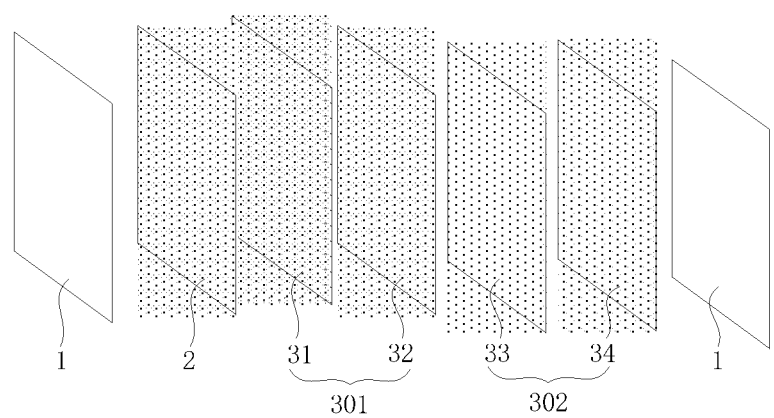
FIG. 2 is a schematic diagram of an exploded structure of a polarizer provided by an embodiment of the present disclosure.

As shown in FIG. 1 and FIG. 2, an embodiment of the present disclosure provides a polarizer which includes two layers of protective films 1, as well as one layer of main polarizing film 2 and at least one layer of auxiliary polarizing film 3 between the two layers of protective films 1, where a set angular difference exists between an angle of a transmittance axis of the auxiliary polarizing film 3 and an angle of a transmittance axis of the main polarizing film 2.

The above polarizer includes not only one layer of main polarizing film 2 and also auxiliary polarizing films 3, where a set angular difference exists between the angle of the transmittance axis of each auxiliary polarizing film 3 and the angle of the transmittance axis of the main polarizing film 2. When a preset included angle between an optical axis of incident light and the transmittance axis of the main polarizing film 2 has deviation, the auxiliary polarizing films 3 can play a role of correction so as to improve an effect of the polarizer. Optionally, for example, for an ADS LCD panel, if deviation occurs between an angle of a transmittance axis of the polarizer on one side (light emitting side) of a color film substrate and a liquid crystal alignment angle, part of emitted light can penetrate through the polarizer to be emitted under a dark state, causing high brightness under the dark state. However, when the polarizer provided by the embodiment of the present disclosure is applied to the light emitting side of the LCD panel, if deviation exists between the angle of the transmittance axis of the main polarizing film 2 and the liquid crystal alignment angle, the auxiliary polarizing films 3 in the polarizer can reduce or compensate for light leakage caused by the above deviation, thus effectively preventing light emission and improving light leakage under the dark state, so as to effectively reduce the brightness under the dark state and increase display contrast.

In a specific embodiment, the above set angular difference can be −3°~3°, for example, −3°, −2°, −1°, 1°, 2°, 3°. Optionally, the deviation between the angle of the transmittance axis of the polarizer (the transmittance axis of the main polarizing film 2) and the liquid crystal alignment angle generally is not greater than 3°. Therefore, the angular difference between the angle of the transmittance axis of each auxiliary polarizing film 3 and the angle of the transmittance axis of the main polarizing film 2 is −3°~3° so as to play roles in correction and compensation, thus reducing a light emitting rate under the dark state and increasing the display contrast.

In a specific embodiment, the at least one layer of auxiliary polarizing film 3 includes at least one layer of negative polarizing film and at least one layer of positive polarizing film, where an angle of a transmittance axis of the negative polarizing film is less than the angle of the transmittance axis of the main polarizing film 2, and an angle of a transmittance axis of the positive polarizing film is greater than the angle of the transmittance axis of the main polarizing film 2.

Exemplarily, the negative polarizing film and the positive polarizing film are set in pairs in the at least one layer of auxiliary polarizing film 3, and each pair of negative polarizing film and positive polarizing film constitute a polarizing film group.

Optionally, the deviation between the angle of the transmittance axis of the polarizer (the transmittance axis of the main polarizing film 2) and the liquid crystal alignment angle can be positive deviation or negative deviation. The positive deviation and negative deviation can be corrected by the above settings, thus effectively reducing the brightness of emitted light under the dark state.

In a specific embodiment, the angle of the transmittance axis of the main polarizing film 2 is 90°, and the sum of the angles of the transmittance axis of the negative polarizing film and the transmittance axis of the positive polarizing film in each polarizing film group is 180°.

Exemplarily, as shown in FIG. 2, the at least one layer of auxiliary polarizing film 3 includes two polarizing film groups 301 and 302, that is, the polarizer includes four layers of auxiliary polarizing films (two negative polarizing films 31 and 33 and two positive polarizing films 32 and 34).

Exemplarily, as shown in FIG. 2, in the two polarizing film groups, angles of a transmittance axis of the negative polarizing film 31 and a transmittance axis of the positive polarizing film 32 in the first polarizing film group 301 are 89° and 91° respectively, and angles of a transmittance axis of the negative polarizing film 33 and a transmittance axis of the positive polarizing film 34 in the second polarizing film group are 88° and 92° respectively.

Optionally, in an actual preparation process, and a formed angle of a transmittance axis allows a certain error whose range is not more than ±0.3°, so that the angle of the transmittance axis of the negative polarizing film 31 can be 88.7°~89.3° and the angle of the transmittance axis of the positive polarizing film 32 can be 90.7°~91.3°, in the first polarizing film group 301; the angle of the transmittance axis of the negative polarizing film 33 can be 87.7°~88.3° and the angle of the transmittance axis of the positive polarizing film 34 can be 91.7°~92.3°, in the second polarizing film group 302.

Certainly, the number of layers of the auxiliary polarizing films in the embodiment of the present disclosure is not limited to four layers in the above embodiment, for example, may be two, three or five layers and the like. The angle of the transmittance axis of each layer of auxiliary polarizing film is also not limited to the record in the above embodiment, and is determined according to actual situations; and in addition, a cascading order of each layer of auxiliary polarizing film is also not limited to the arrangement in the accompanying drawings of the specification. For example, the two layers of films in each polarizing film group can be adjacent or separated, and when in specific design, the main polarizing film can be arranged between the layers of auxiliary polarizing films, which is not limited herein.

Exemplarily, in the polarizer provided by the embodiment of the present disclosure, the protective films can be triacetate cellulose (TAC) films, and the polarizing films can be polyvinyl alcohol (PVA).

Optionally, an embodiment of the present disclosure also provides a display panel which includes the polarizer according to any one of the above embodiments.

Exemplarily, the display panel includes LCD module which is composed of an array substrate and a color film substrate. The above polarizer is arranged on the color film substrate (a light emitting side) of the LCD module, and can be used as a polarization analyzer to be used with a polarizing polarizer on the array substrate in a matching manner, thus jointly controlling light output of the display panel.

Exemplarily, the display panel provided by the embodiment of the present disclosure can be an ADS-LCD panel.

For the above display panel provided by the embodiment of the present disclosure, the polarizer on the color film substrate (the light emitting side) is provided with the main polarizing film and the at least one layer of auxiliary polarizing film. When deviation exists between the angle of the transmittance axis of the polarizer (the transmittance axis of the main polarizing film) and the liquid crystal alignment angle, the polarizer can effectively prevent transmission of the emitted light, thus reducing the brightness under the dark state and effectively increasing the display contrast.

Additionally, an embodiment of the present disclosure also provides a display device which includes the above display panel.

Optionally, the display device can be a TV set, a displayer, a laptop and a tablet computer, etc., which is not limited herein.

Figure 3:
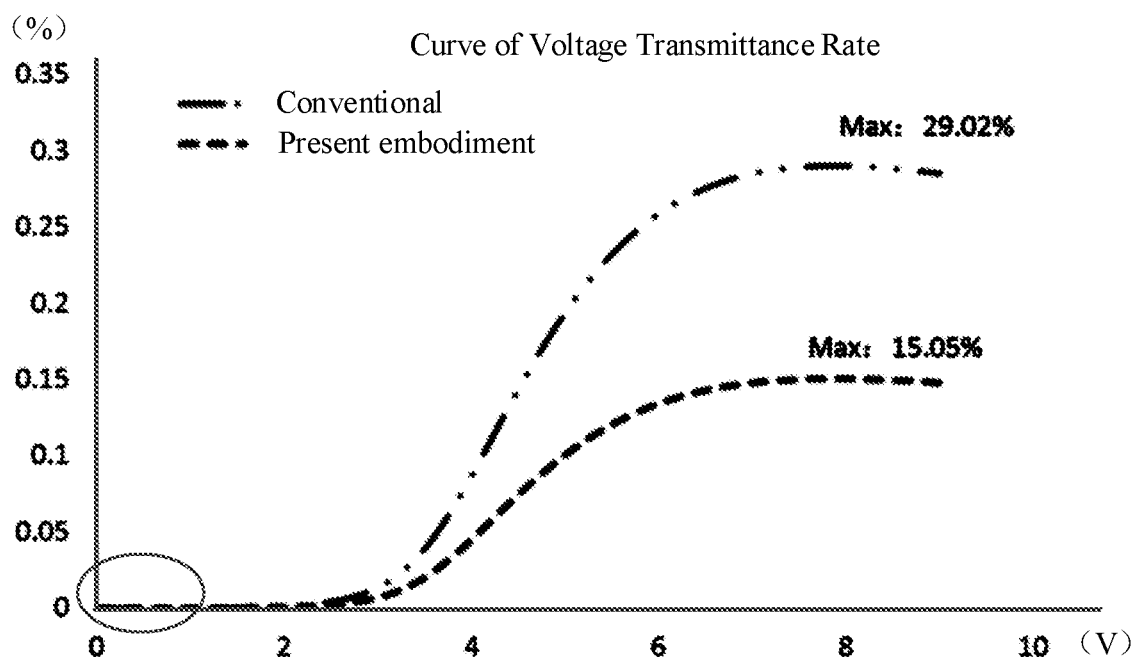
FIG. 3 is a schematic diagram of comparison of a VT analog curve of a display device provided by the embodiment of this invention and a common display device.
Figure 4:
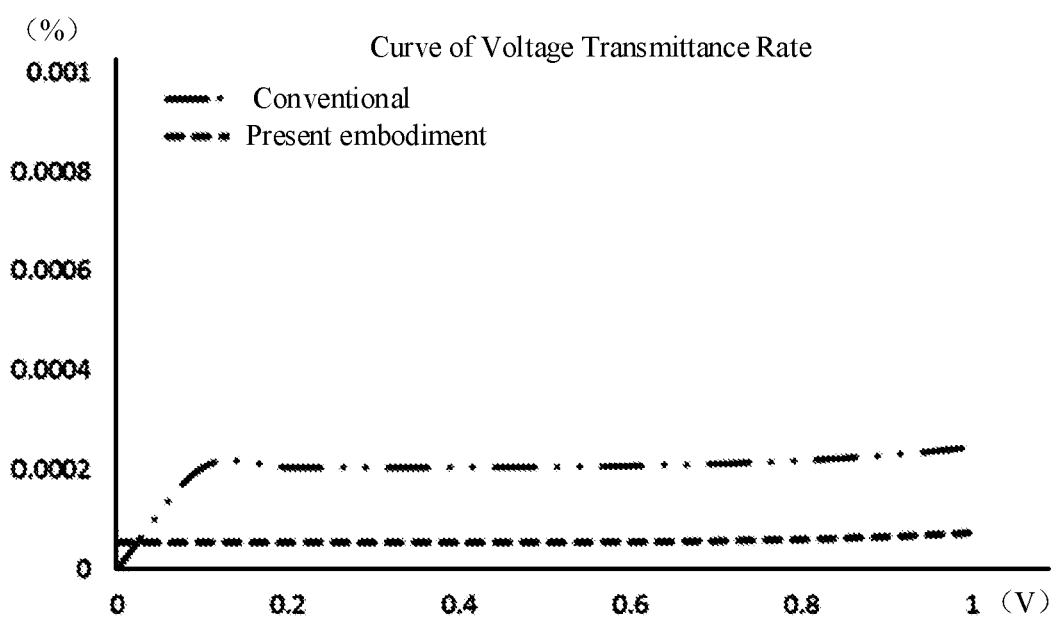
FIG. 4 is an enlarged diagram of a graph in an oval line frame area in FIG. 3.

As shown in FIG. 3 and FIG. 4, to make clear how the polarizer provided by the embodiment of the present disclosure improves the brightness under the dark state (brightness in a black picture) and the contrast for the display device, the display device provided by the embodiment of the present disclosure and a common display device are compared and analyzed below by taking an ASD-LCD device as an example. Optionally, in the display device provided by the embodiment of the present disclosure, the polarization analyzer on the color film substrate uses the polarizer provided by the embodiment of the present disclosure, where the polarizer is provided with one layer of main polarizing film and four layers of auxiliary polarizing films, the angle of the transmittance axis of the main polarizing film is 90°, and the angles of the transmittance axes of the four layers of auxiliary polarizing films are 89°, 91°, 88° and 92° respectively; and in the common display device, a polarization analyzer on the color film substrate uses a common polarizer which has only one layer of polarizing film, where an angle of a transmittance axis of the polarizing film is 90°. FIG. 3 and FIG. 4 are curves (VT curves) of change of transmittance rates of the above two display devices with a driving voltage obtained by TechWiz 2D simulation, where "common" represents the VT curve of the common display device, and "the present embodiment" represents the VT curve of the display device of the embodiment of the present disclosure. Seen from FIG. 3 and FIG. 4, although the overall transmittance rate (namely, the transmittance rate under the dark state and the transmittance rate under a bright state) of the display device of the embodiment of the present disclosure decreases compared to the transmittance rate of the common display device, the transmittance rate under the dark state (in a black picture) decreases more comparatively, that is, the display device of the embodiment of the present disclosure has very low brightness under the dark state (in the black picture), and therefore, the black picture has high quality. Optionally, to facilitate the calculation of the contrast, the brightness under a voltage of 0.2V is generally selected as the brightness under the dark state. Furthermore, from FIG. 3 and FIG. 4, under the dark state (in the black picture), the common display device and the display device of the embodiment of the present disclosure have transmittance rates of 0.02% and 0.006% respectively, while under the bright state (a display state in maximum brightness), the common display device and the display device of the embodiment of the present disclosure have transmittance rates of 29.02% and 15.05% respectively. After calculation, the common display device and the display device of the embodiment of the present disclosure have contrasts of 1451 and 2508 respectively. Based on the contrasts, the display device of the embodiment of the present disclosure has a significantly enhanced contrast compared to the common display device, thus improving picture quality to a great extent.

Clearly, those skilled in the art can make various changes and modifications on the embodiments of the present disclosure without detaching from the spirit and scope of the present disclosure. Therefore, if the changes and modifications of the present disclosure are in the scope of the claims of the present disclosure and equivalent technologies thereof, the present disclosure also intends to include the changes and modifications.

The invention claimed is:

1. A polarizer, comprising two protective films, one main polarizing film and at least one auxiliary polarizing film, the main polarizing film and the auxiliary polarizing film are between the two protective films, wherein a set angular difference exists between an angle of a transmittance axis of the auxiliary polarizing film and an angle of a transmittance axis of the main polarizing film;

wherein the set angular difference is −3°~3°.

2. The polarizer according to claim 1, comprising a plurality of auxiliary polarizing films comprising at least one negative polarizing film and at least one positive polarizing film, an angle of a transmittance axis of the negative polarizing film is less than the angle of the transmittance axis of the main polarizing film, and an angle of a transmittance axis of the positive polarizing film is greater than the angle of the transmittance axis of the main polarizing film.

3. The polarizer according to claim 2, wherein the negative polarizing film and the positive polarizing film are set in pairs, and a pair of negative polarizing film and positive polarizing film constitute a polarizing film group.

4. The polarizer according to claim 3, wherein the angle of the transmittance axis of the main polarizing film is 90°, and a sum of the angles of the transmittance axis of the negative polarizing film and the transmittance axis of the positive polarizing film in the polarizing film group is 180°.

5. The polarizer according to claim 3, wherein the plurality of auxiliary polarizing films comprise two polarizing film groups.

6. The polarizer according to claim 5, wherein an angle of a transmittance axis of a negative polarizing film is 88.7°~89.3° and an angle of a transmittance axis of a positive polarizing film is 90.7°~91.3° in a first polarizing film group of the two polarizing film groups; an angle of a transmittance axis of a negative polarizing film is 87.7°~88.3° and an angle of a transmittance axis of a positive polarizing film is 91.7°~92.3° in a second polarizing film group of the two polarizing film groups.

7. The polarizer according to claim 6, wherein the angles of the transmittance axis of the negative polarizing film and the transmittance axis of the positive polarizing film in the first polarizing film group are 89° and 91° respectively, and the angles of the transmittance axis of the negative polarizing film and the transmittance axis of the positive polarizing film in the second polarizing film group are 88° and 92° respectively.

8. A display panel, comprising the polarizer according to claim 1.

9. The display panel according to claim 8, wherein the polarizer comprises a plurality of auxiliary polarizing films comprising at least one negative polarizing film and at least one positive polarizing film, an angle of a transmittance axis of the negative polarizing film is less than the angle of the transmittance axis of the main polarizing film, and an angle of a transmittance axis of the positive polarizing film is greater than the angle of the transmittance axis of the main polarizing film.

10. The display panel according to claim 9, wherein the negative polarizing film and the positive polarizing film are set in pairs, and a pair of negative polarizing film and positive polarizing film constitute a polarizing film group.

11. The display panel according to claim 10, wherein the angle of the transmittance axis of the main polarizing film is 90°, and a sum of the angles of the transmittance axis of the negative polarizing film and the transmittance axis of the positive polarizing film in the polarizing film group is 180°.

12. The display panel according to claim 10, wherein the plurality of auxiliary polarizing films comprise two polarizing film groups.

13. The display panel according to claim 12, wherein an angle of a transmittance axis of a negative polarizing film is 88.7°~89.3° and an angle of a transmittance axis of a positive polarizing film is 90.7°~91.3° in a first polarizing film group of the two polarizing film groups; an angle of a transmittance axis of a negative polarizing film is 87.7°~88.3° and an angle of a transmittance axis of a positive polarizing film is 91.7°~92.3° in a second polarizing film group of the two polarizing film groups.

14. The display panel according to claim 13, wherein the angles of the transmittance axis of the negative polarizing film and the transmittance axis of the positive polarizing film in the first polarizing film group are 89° and 91° respectively, and the angles of the transmittance axis of the negative polarizing film and the transmittance axis of the positive polarizing film in the second polarizing film group are 88° and 92° respectively.

15. The display panel according to claim 8, further comprising an LCD module, wherein the polarizer is arranged on a color film substrate of the LCD module.

16. A display device, comprising the display panel according to claim 8.

* * * * *